United States Patent [19]

Ceramicoli

[11] 4,158,304
[45] Jun. 19, 1979

[54] TESTING OF FLUIDIC DEVICES

[76] Inventor: John Ceramicoli, 211 Beaver St., Framingham, Mass. 01701

[21] Appl. No.: 836,540

[22] Filed: Sep. 26, 1977

[51] Int. Cl.² ............................................. G01M 19/00
[52] U.S. Cl. ........................................ 73/49.8; 73/168
[58] Field of Search .................... 73/49.8, 168; 138/90, 138/89; 285/177

[56] References Cited

U.S. PATENT DOCUMENTS

| 2,311,708 | 2/1943 | Sundholm | 285/177 |
| 3,213,674 | 10/1965 | Salcido | 73/49.8 |
| 3,389,600 | 6/1968 | Rau | 73/168 |

Primary Examiner—S. Clement Swisher
Attorney, Agent, or Firm—George E. Kersey

[57] ABSTRACT

Method and apparatus for the testing of fluidic devices. An adaptor that provides a temporary interface with such a device is affixed to it and used to direct a gaseous medium into the device for the testing of its various portions.

9 Claims, 3 Drawing Figures

TESTING OF FLUIDIC DEVICES

BACKGROUND OF THE INVENTION

This invention relates to the testing of fluid activated, i.e. fluidic, devices and, more particularly, the testing of automatic transmissions.

Fluidic devices have constituents which move relative to one another through the application of fluid pressure. The constituents are generally tied to one another by flexible couplings which combine the fluid to desired regions of the device. In the case of a hydraulic transmission, various drums and pistons are sealed to one another and controlled by hydraulic pressure. If the seals are defective or improperly installed, the unit will leak.

The typical procedure is to assemble the entire unit and then test it for leaks. If a leak is located, it is necessary to disassemble the entire unit, correct the difficulty, reassemble the unit, and test it again.

In units such as transmissions, minor imperfections in the seals, such as hairline scratches which are barely visible to the human eye, prevent or at least interfer with proper operation.

Accordingly, it is an object of the invention to facilitate the testing of fluidic devices. A related object is to facilitate the testing of hydraulic devices. A still further related object is to facilitate the testing of hydraulic transmissions.

A further object of the invention is to allow the testing of hydraulic devices for leaks, without the necessity of assembling the entire device before subjecting it to test, thus eliminating the necessity of disassembling the entire unit should one or more of the constituent components prove to be defective.

SUMMARY OF THE INVENTION

In accomplishing the foregoing and related objects the invention provides for applying an interface adapter to a fludic device to be tested. A gaseous medium, such as air, is then directed into the device through the adapter. Any failure in the device is then apparent without the need for operation under actual working conditions.

In accordance with one aspect of the invention, the device is normally operated hydraucally but is tested with an adapter using air. Accordingly, any defect in the device is detected without the need for subjecting the device to hydraulic fluids and pressures.

In accordance with another aspect of the invention, the interface provides a temporary conduit from a testing source into selectable operating regions of the device. The device under test desirably includes a shaft and the adapter fits onto the shaft.

In accordance with a further aspect of the invention, the device under test includes parts that are sealed to other parts by flexible couplings, and the adapter has separate internal channels for selectively directing the testing medium into prescribed regions of the device.

In accordance with still another aspect of the invention, each separate channel of the adapter extends from a separate external fitting to an exit port that is able to communicate with a corresponding port in the device. Each exit port is desirably in a groove which is bounded by snap rings to promote a suitable seal between the adapter and the device being tested.

DESCRIPTION OF THE DRAWINGS

Other aspects of the invention will become apparent after considering several illustrative embodiments, taken in conjunction with the drawings in which.

DETAILED DESCRIPTION

Figure 1:
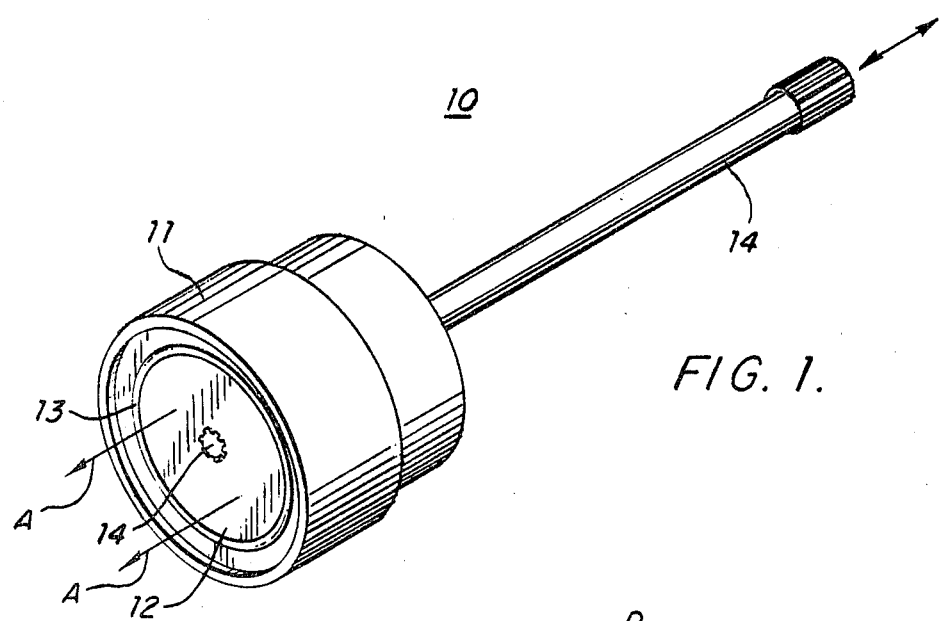
FIG. 1 is a perspective view of a partial fluidic device for test in accordance with the invention.

Turning to the drawings, a perspective view of an illustrative fluidic device 10 is shown in FIG. 1.

The particular device 10 represents a forward clutch from a hydraulic transmission used in the automatic shifting of gears in an automotive vehicle. The clutch 10 is merely one of a large number of parts included in such a transmission. Other components include a reverse clutch, spiral gears, round gears which ride in the spiral gears, various drums such as the lower and reverse drums and a pump for the circulation of hydraulic fluid.

In the particular clutch 10 a drum 11 is sealed to a piston 12 by an "O" ring 13. When hydraulic fluid is directed into the interior portion of the piston 12 (not visible in FIG. 1) the piston 12 moves outwardly along splines of the shaft 14 in the direction indicated by the arrows A.

If the "O" ring 13 is damaged, the unit 10 will leak fluid. Unfortunately the ring 13 is easily damaged. Even a hair line scratch which may not be detectable by visual inspection of the part, can cause leaks because of the substantial pressure of the fluid used in the device.

The usual practice is to disassemble the entire transmission and replace the "O" ring. The device is then reassembled and tested. If the seal does not seat properly, it is replaced.

Figure 2:
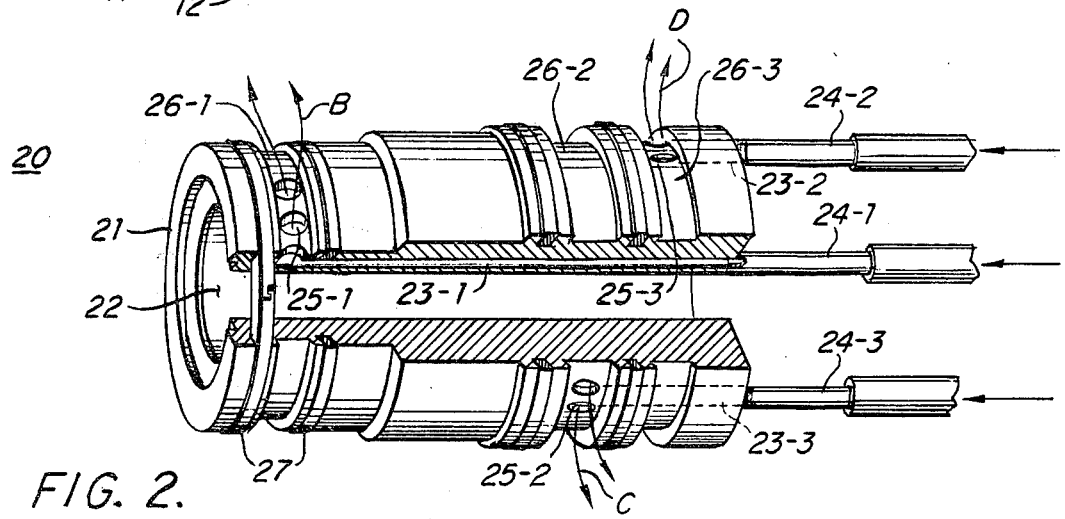
FIG. 2 is a perspective view of an adapter, partially in section, showing the adapter for testing the fluidic devices of the kind shown in FIG. 1.

The foregoing is a time consuming procedure which is overcome by the invention using the special adapter 20 shown in FIG. 2.

The adapter 20 is formed by a housing 21 with a bore 22 containing bearings 22b to permit the adapter to be positioned on a shaft, such as the shaft 14 of FIG. 1. The adapter includes interior channels 23-1, 23-2 and 23-3 that extend from respective fittings 24-1, 24-2 and 24-3 to respective origices 25-1, 25-2 and 25-3.

The orifices 25-1, 25-2 and 25-3 in turn are in respective channels 26-1, 26-2 and 26-3. Each channel is bounded by snap rings 27 to provide a seal for the flow of gas from the associated fitting 24-1, 24-2 or 24-3. The ends of each snap ring are interlocked by complementary "L" shaped ends as shown in FIG. 2 for the channel 26-1.

Figure 3:
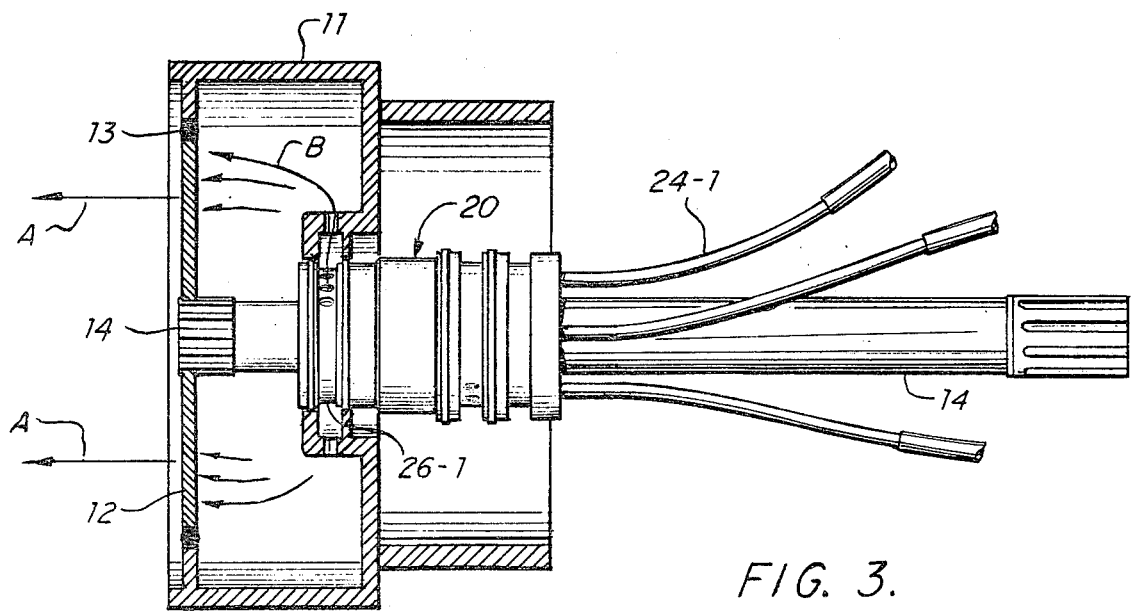
FIG. 3 is a sectional view showing the adapter of FIG. 2 in use.

The operation of the adapter 20 is illustrated in FIG. 3. The adapter 20 is placed on the shaft 14 and the appropriate fitting, e.g. 24-1, is connected to a source of gas (not shown).

As indicated in FIG. 2, the fitting 24-1 is connected to the adapter 20 at the extremity of an internal channel 23-1 that extends along the adapter in an axial direction and terminates in the vicinity of exit ports 26-1. When the adapter 20 is positioned on the shaft 14 the channel 26-1 can be aligned with a corresponding portion of the drum 11. The channel 26-1 is then sealed to the drum 11 at contacted peripheries by the rings 27.

Consequently when the adapter is positioned on the shaft 14 as shown in FIG. 3, and air is applied to the fitting 24-1, it travels along the channel 23-1 and exits from the ports 25-1 (FIG. 2) into the channel 26, then flowing into the interior of the drum 11 as indicated by the arrows B in FIG. 2. The air pressure indicated by the arrows B now applies pressure to the piston 12.

If the "O" ring 13 provides a proper seal between the drum 11 and the piston 12, the piston 12 will move in the direction indicated by the arrows A with respect to the splined end of the shaft 14. If the seal 13 is improper there will be leakage between the drum 11 and the piston 12 at the seal position. It will be understood that the seal 13 of FIG. 3 is merely illustrative and that other kinds of seals may be tested as well using the adapter 20.

The adapter 20 also is used in the testing of other portions of an overall fluidic device using, for example, the remaining inlets 24-2 and 24-3 and providing test air pressure in the associated channels when positioned on a fluidic device to provide an appropriate temporary conduit into selected test regions of the device.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. The method of testing fluidic devices which comprises
    applying an interface adapter to the device, said adapter including an internal channel that extends to a port which is able to communicate with a corresponding part of the device and is located in a groove bounded by snap rings;
    and directing a gaseous medium into said device through said internal channel.
2. The method of claim 1 wherein the gaseous medium is air and the fluidic device is hydraucally operated.
3. The method of claim 1 wherein the interface provides a temporary conduit from an entry port into the device.
4. The method of claim 1 wherein the fluidic device includes a shaft and the adapter fits thereon.
5. The method of claim 4 wherein said clutch includes a movable part that is sealed to another part by a flexible coupling.
6. The method of claim 1 wherein said adapter includes a plurality of separate internal channels for selectively directing a gaseous medium into said device for testing.
7. The method of claim 6 wherein each channel extends from a separate external fitting to a port that is able to communicate with a corresponding part in said device.
8. The method of claim 7 wherein each port of said device is in a groove thereon.
9. The method of claim 8 wherein the snap rings have interlocking ends.

* * * * *